June 30, 1925.　　　H. M. NAUGLE ET AL　　　1,544,028
EXPANDED METAL MANUFACTURE
Filed June 1, 1922　　　7 Sheets-Sheet 1
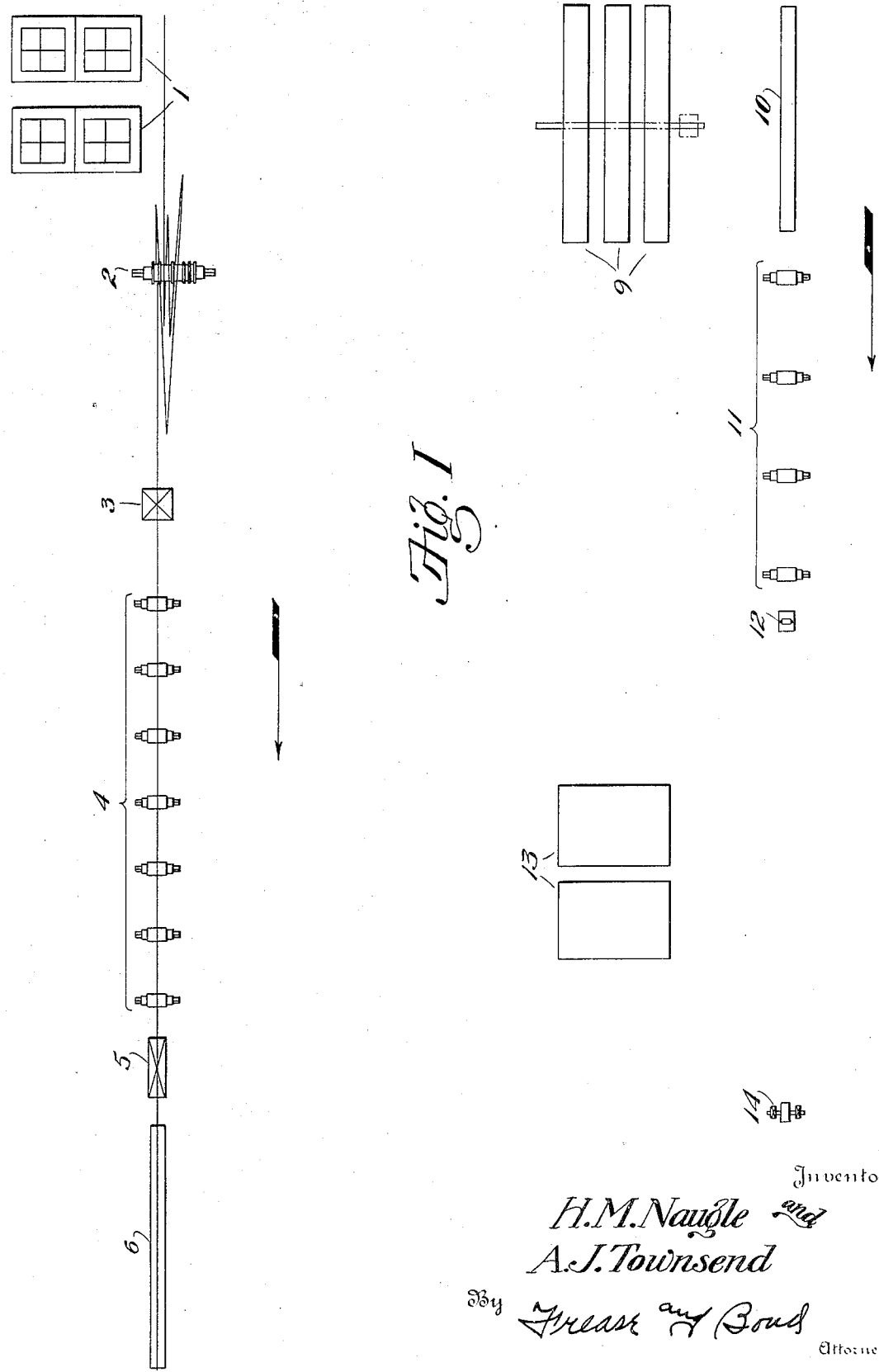

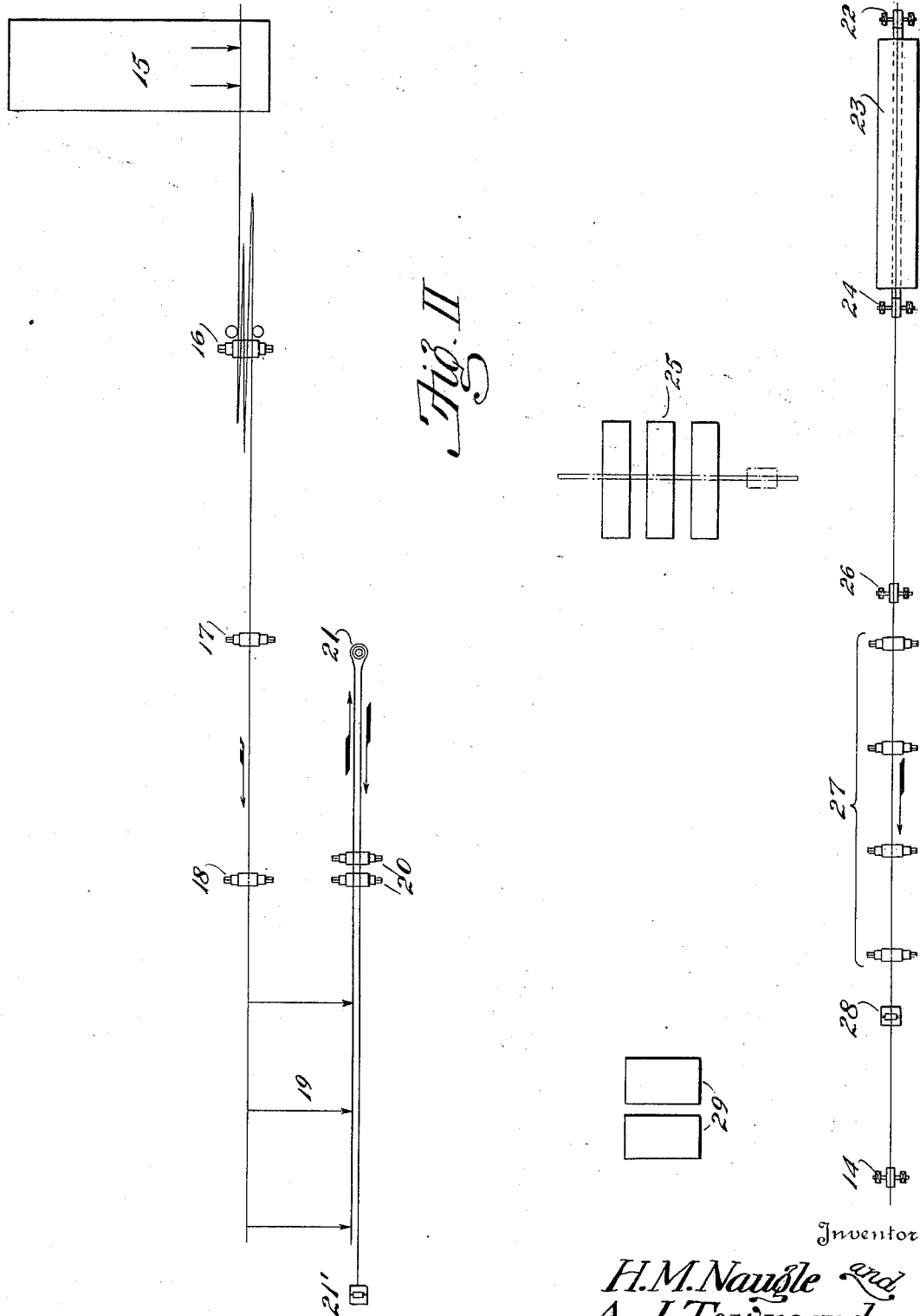

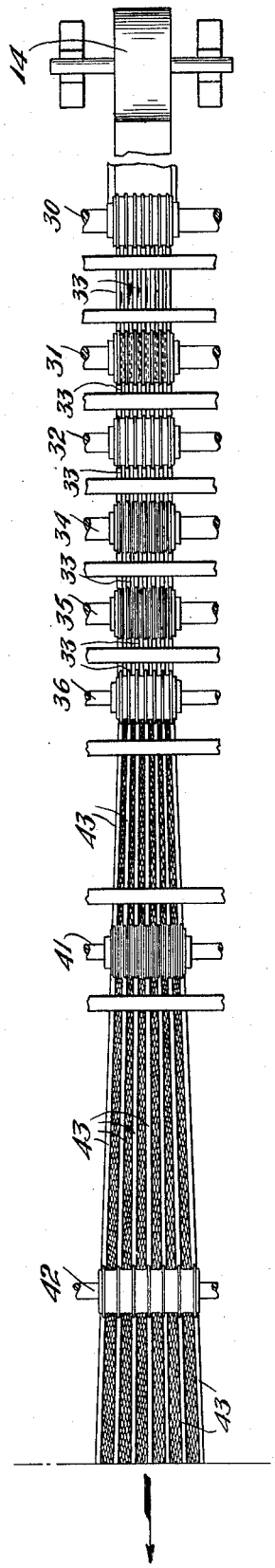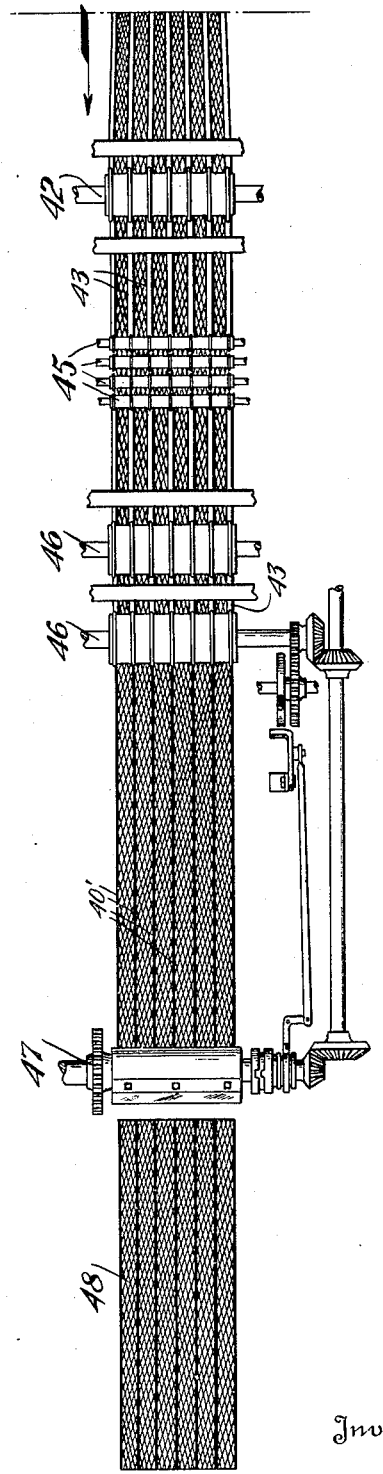

June 30, 1925.  H. M. NAUGLE ET AL  1,544,028
EXPANDED METAL MANUFACTURE
Filed June 1, 1922   7 Sheets-Sheet 4
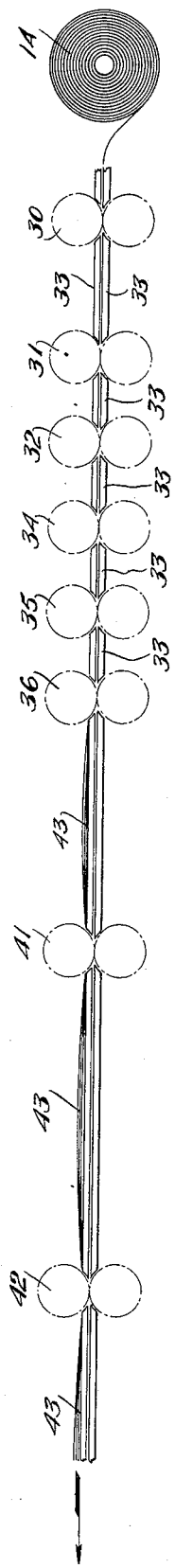
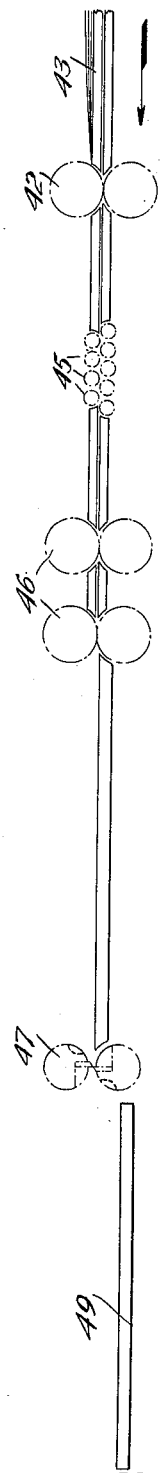
Fig. IV
Inventor
H.M.Naugle and
A.J.Townsend
By Frease and Bond
Attorneys

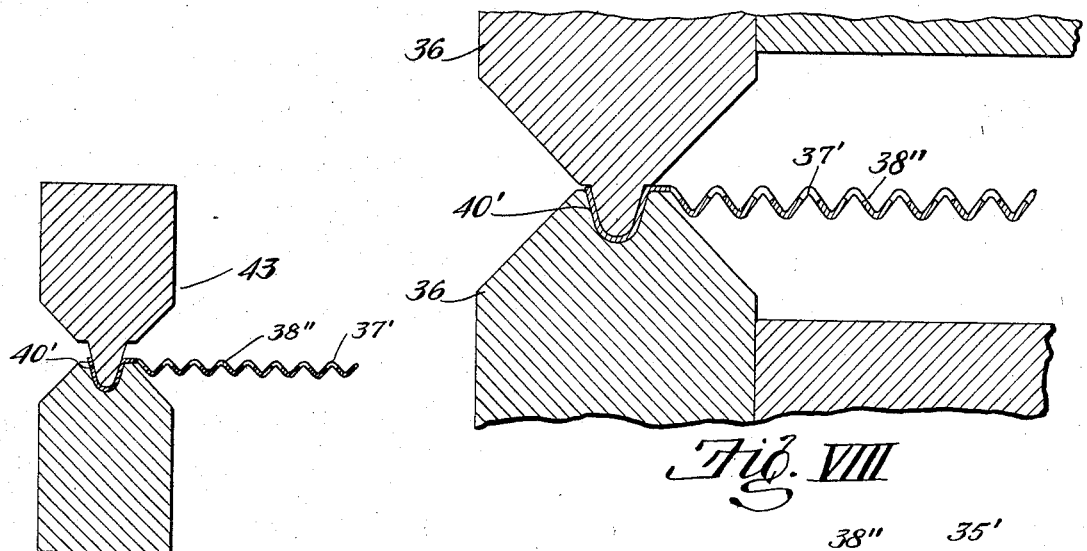
Fig. VIII
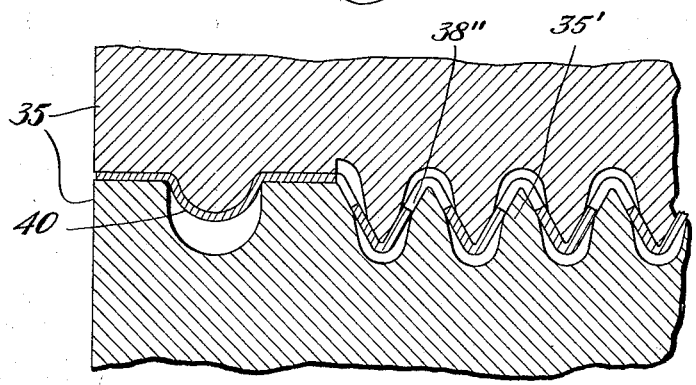
Fig. VII
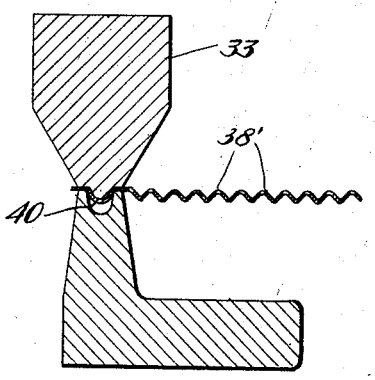
Fig. IX
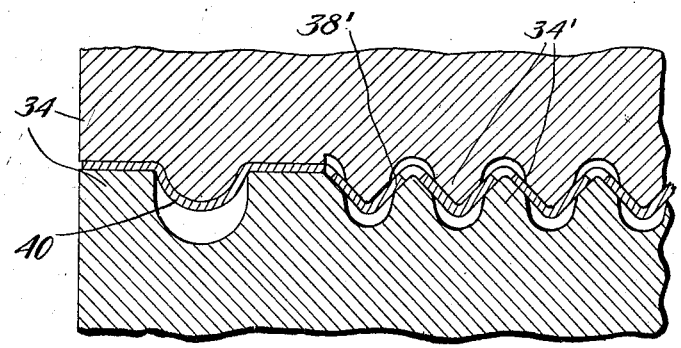
Fig. V
Inventor
H. M. Naugle and
A. J. Townsend
By Freese and Boyd
Attorneys June 30, 1925. 1,544,028
H. M. NAUGLE ET AL
EXPANDED METAL MANUFACTURE
Filed June 1, 1922 7 Sheets-Sheet 6
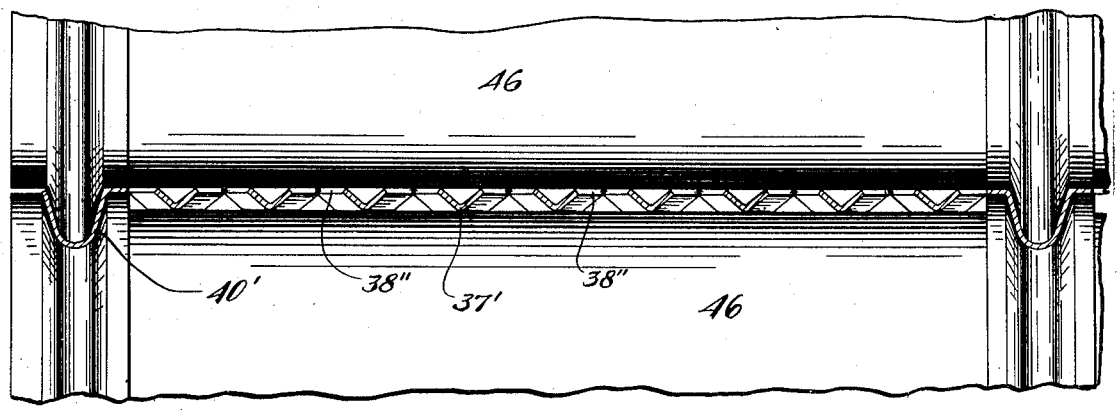
Fig. XII
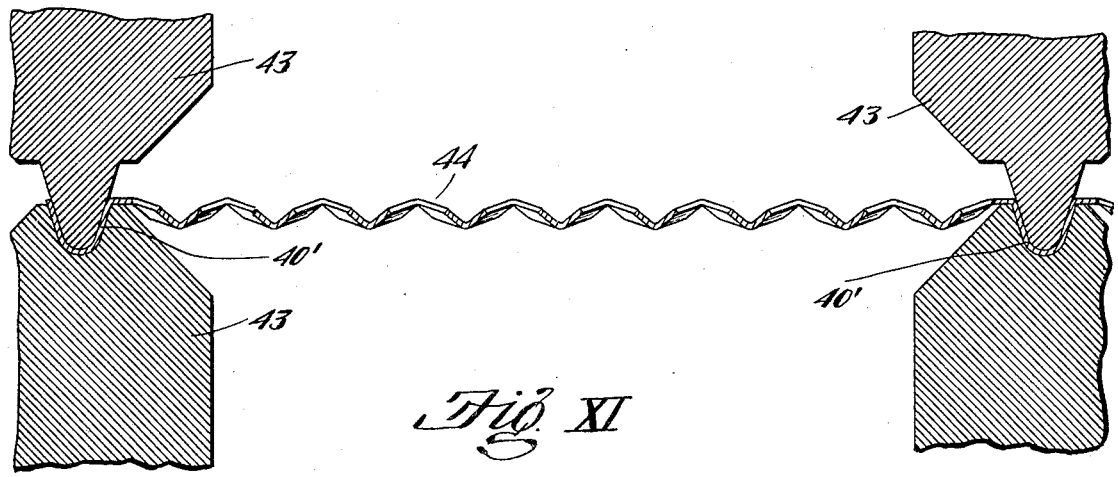
Fig. XI
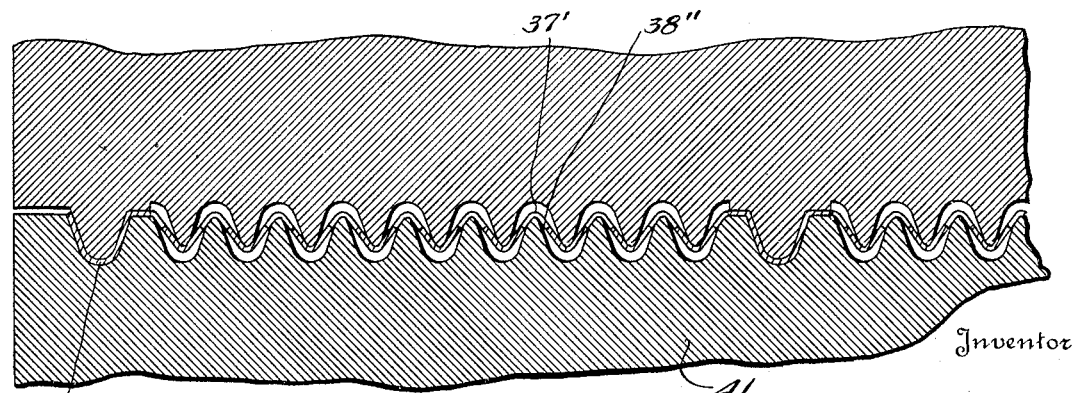
Fig. X
Inventor
H. M. Naugle and
A. J. Townsend
By Freast and Bond
Attorneys

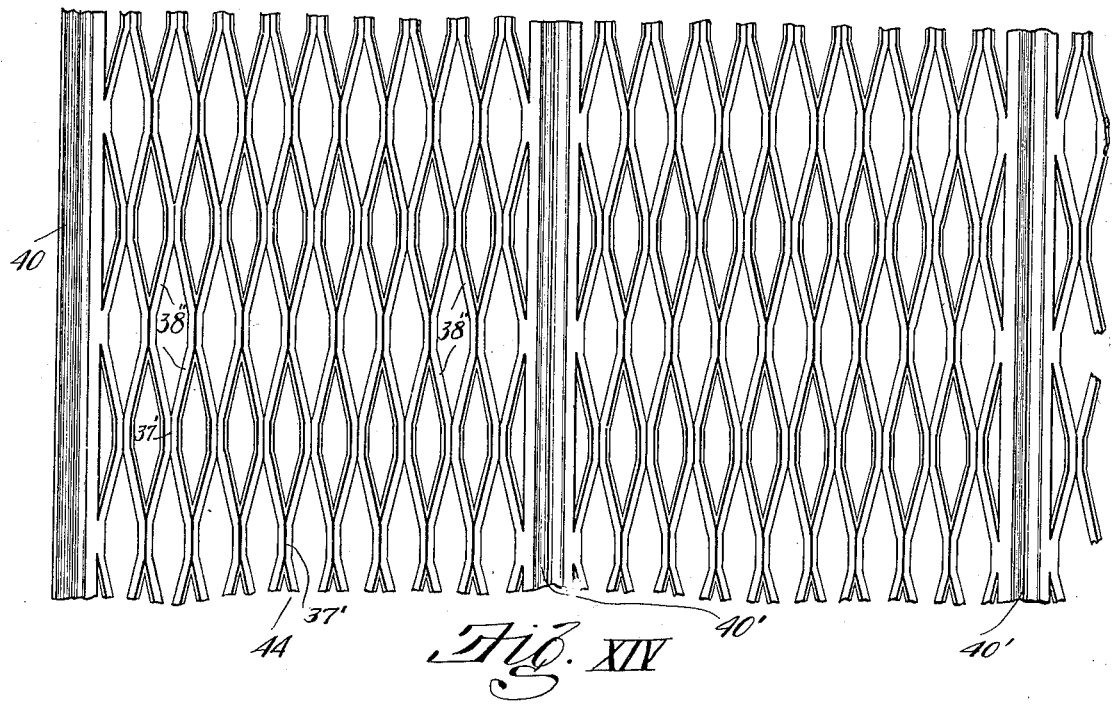
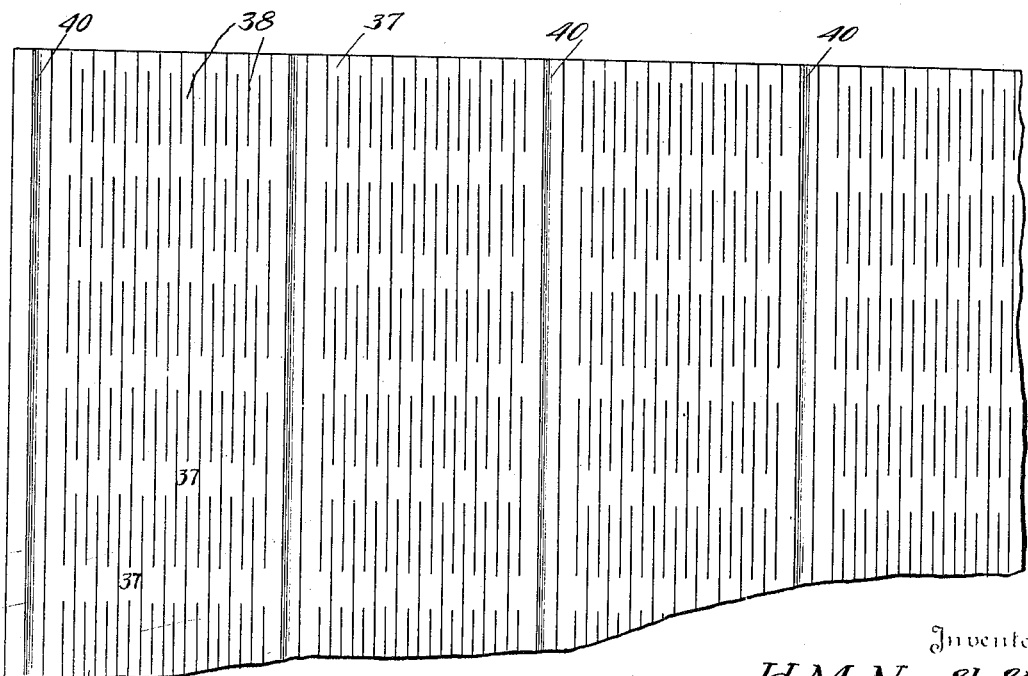

Patented June 30, 1925.

1,544,028

UNITED STATES PATENT OFFICE.

HARRY M. NAUGLE AND ARTHUR J. TOWNSEND, OF CANTON, OHIO.

EXPANDED-METAL MANUFACTURE.

Application filed June 1, 1922. Serial No. 565,127.

*To all whom it may concern:*

Be it known that we, HARRY M. NAUGLE and ARTHUR J. TOWNSEND, citizens of the United States, residing at Canton, in the county of Stark and State of Ohio, have invented certain new and useful Improvements in Expanded-Metal Manufacture, of which the following is a specification.

The invention relates to methods and apparatus for making expanded metal lath and the like; and the objects of the improvement are to avoid imperfections in the product and losses in production, to decrease difficulties in operation and increase the output of the slitting, stretching and expanding machines, and finally to reduce the cost of manufacture.

The slitting, stretching and expanding operations can best be performed upon a comparatively soft sheet having deep drawing or ductile qualities; but the difficulty of entering the ends of slit sheets into the rolls and guides of a lath machine without buckling or bending the same, has compelled the use of harder sheets than should properly be used, and the fact that there must be a considerable phosphorous content in sheet bars to prevent a sticking of the sheets in the hot rolling and doubling processes, has prevented the production of sheets with the desired ductility for the expanding processes.

Expanded metal lath has always been made from steel sheets having characteristics and imperfections necessarily resulting from the methods employed in their production, which impede the operation of the lath machine and impair its efficiency; especially when the sheets are slit longitudinally to form strands which are stretched or elongated for expanding without shortening the sheet. The deficiencies referred to are the lack of uniformity in thickness and temper and the presence of transverse pipe flaws.

Steel sheets are made from sheet bars which have been reduced by a longitudinal hot rolling from an ingot or a bloom to a width of eight inches or more, and a thickness of about one-fourth of an inch or more. These bars are cut into sections at least twenty-four inches long, which are heated and rolled crosswise of the original bar and reduced by hot rolling and doubling to produce a sheet from eight to twelve feet long and slightly over twenty-four inches wide, with a thickness of about twenty-four gauge, when intended for use in making expanded lath.

The hot rolls used for reducing ordinary sheets are of such length, that however well they may be turned, there is sufficient spring in the rolls to make the side and edge portions of the finished sheets thinner than the intermediate and middle portions thereof; and likewise the annealing processes make the side and edge portions of the sheets softer and more ductile than the intermediate and middle portions.

These differences of thickness and temper may be so slight as to be negligible when sheets are usesd for ordinary purposes, but where they are cut into three longitudinal strips eight inches wide for making expanded sheets, each middle strip is so much thicker and harder than the side strips, and each side strip is so much thinner and softer at the outer edge than at the inner edge, that it is impossible to adjust a lath machine to properly handle the doubly differential strips without frequent faults in the operation of the machine.

The method employed in producing ordinary sheets also positions the original longitudinal grain of the sheet bar transversely in the finished sheet; and even though the grain may be partially or entirely eliminated by the cross rolling and doubling operations, there yet remain the pipe flaws which originate in the ingot and extend longitudinally in the sheet bar and then transversely in the finished sheet, which are frequently ruptured and parted by the longitudinal stretching of the strands formed by the longitudinal slits in the sheets.

Furthermore, the necessity of trimming the side edges of an ordinary sheet to make strips of the exact width required for an expanded sheet, and the necessity of trimming both ends of an expanded sheet to square them and to cut-off bent and buckled strands, results in a considerable loss of material; and finally, the slow speed at which the expanding machine must be run to permit the ends of successive sheets to properly enter between the rolls and guides, limits the output of the machine, and the necessary interval between the ends of successive short sheets, however promptly they may be fed, again reduces the productive capacity of the lath machine.

These deficiences in the product and difficulties in the operation of a metal lath machine are ameliorated, if not entirely overcome, by the present improved method of making expanded sheets from strip-sheets, produced from hot rolled strips, skelp or sheet bars, reduced by a longitudinally cold rolling to the exact width and gauge required for the slitting, stretching and expanding operations, and of such a considerable length that after the forward end has passed through the lath machine, the operation of the same can be increased to a maximum speed while the remainder of the strip-sheet is passing through the machine.

The method of producing strip-sheets from hot rolled strips, skelp or sheet bars, permits the use of a metal having the phosphorous content reduced to a minimum with a resulting increase in the ductile and drawing qualities thereof; the comparatively short rolls required for reducing the strips to relatively narrow sheets, referred to herein as strip-sheets, gives a uniform thickness from side to side; and the narrow width of the strip-sheets permits the same to be annealed to give a uniform temper from side to side.

Furthermore, the long length of the strip-sheets greatly reduces the number of forward ends which must be passed through the machine, and eliminates the intervals between a series of shorter sheets; and finally, the longitudinal reduction to sheet gauge, maintains the grain and pipe flaws lengthwise of the sheet, and eliminates the danger of rupture, arising from a crosswise grain or a transverse pipe flaw.

The present invention therefore involves the reduction of an ingot to a sheet bar or skelp, or the reduction of a slab to a strip, by a longitudinal hot rolling process; followed by the reduction of a sheet bar, a skelp or a strip or the like to a sheet gauge, by a longitudinal cold rolling process, and the necessary annealing processes to properly temper the metal; and then followed by the slitting, stretching and expanding operations for making plain lath, with which may be associated the beading and ribbing operations for making ribbed lath, and all of which may be done by a continuous longitudinal movement of the material through the lath machine.

The improved method may be carried out by the apparatus illustrated in the accompanying drawings, forming part hereof, in which;

Figure I is a diagrammatic plan of apparatus for making a sheet bar or skelp from an ingot and reducing the same to a strip-sheet;

Fig. II, a diagrammatic plan of apparatus for making a strip from a slab and reducing the same to a strip-sheet;

Fig. III, a diagrammatic plan of a machine for making expanded ribbed lath from a strip-sheet;

Fig. IV, a diagrammatic side elevation of the same;

Fig. V, a fragmentary section of first corrugating rolls;

Fig. VI, a fragmentary section of bead guides;

Fig. VII, a fragmentary section of initial stretching rolls;

Fig. VIII, a fragmentary section of ribbing rolls;

Fig. IX, a fragmentary section of rib guides;

Fig. X, a fragmentary section of final stretching rolls;

Fig. XI, a fragmentary section of expanding guides;

Fig. XII, a fragmentary elevation of mesh flattening rolls;

Fig. XIII, a fragmentary plan of a beaded and slit sheet; and

Fig. XIV, a fragmentary plan of a ribbed and expanded sheet.

Similar numerals refer to similar parts, throughout the drawings.

The preferred method of making strip-sheets is illustrated in Fig. I, and beginning with ingot soaking pits 1 the apparatus may include a blooming mill 2, a bloom shear 3, a seven stand continuous mill 4, and an automatic shear 5, by means of which an ingot may be reduced longitudinally and cut into sheet bars of say forty feet long, some eight to twelve inches wide, and about seven gauge in thickness, the same being assembled on a piller 6.

The scale is then removed from the sheet bar by a pickler 9 whence it is placed upon a table 10 and passed one or more times through a plurality of cold mills 11 and annealed as may be required, by which it is reduced to say twenty-four gauge in thickness and some three hundred and fifty feet long. The strip-sheet may then be wound upon a coiler 12, whence the coiled bar is softened in box annealing ovens 13, and is then placed on a coil rack 14 located at the forward end of a lath machine, which may be of the form illustrated in Figs. III and IV.

An alternate method of making strip-sheets is illustrated in Fig. II, and beginning with a slab heating furnace 15, the apparatus may include a roughing mill 16, an intermediate roughing mill 17, a stranding mill 18, a transfer 19 and a dual finishing mill 20 with a repeater 21, by means of which a slab may be reduced longitudinally to a strip which may have a length of one hundred and fifty feet, a width of eight to twelve inches and a thickness of sixteen gauge, which may be wound upon a coiler 21'.

The coiled strip is then placed upon a coil rack 22, from which it is passed through an open annealing furnace 23 and rewound upon a coiler 24, whence the scale is removed from the strip by a pickler 25, and the coil placed upon a coil rack 26; from which the strip is passed through a plurality of cold mills 27 by which it is reduced to some twenty-four gauge in thickness, and may have a length of some four hundred and fifty feet. It is again wound upon a coiler 28, whence the strip sheet is softened in an annealing oven 29 and then placed upon the coil rack 14 located at the forward end of the lath machine as shown in Fig. 3.

By either method the strip-sheet may be made of the exact width required for entering the lath machine, without requiring any edge trimming, and it is evident that the comparatively short length of the cold rolls will give a uniform thickness throughout the length and width of the strip sheet, and that its relatively narrow width permits the annealing process to give a uniform softness throughout the strip-sheet. Also, that the reduction to sheet gauge entirely by longitudinal rolling produces only a longitudinal grain in the strip sheet, and locates any pipe flaws there may be longitudinally thereof.

The strip-sheet may then be passed from the coil rack 14 directly and continuously through a lath machine, which may preferably include a beading roll 30, a slitting roll 31, and a flattening roll 32, with intervening bead guides 33, by which the strip-sheet is beaded, slitted and flattened, as shown in Fig. XIII.

The sheet is then passed continuously through corrugating rolls 34, strand stretching rolls 35, ribbing rolls 36, and intervening bead guides 33; by means of which the bonds 37 are longitudinally corrugated and the strands 38 are laterally inclined, as shown at 38' in Fig. V, the strands are initially stretched as shown at 38'' in Fig. VII, and the beads 40 are deepened to form ribs 40' as shown in Fig. VIII, the material for the ribs being supplied by a separation of the bonds 37'', which is permitted by the elongation of the strands 38'' caused by the action of the corrugating and initial stretching rolls.

The corrugating dies 34' are in the form of V-shaped flanges, having an angle of say 90° so as to cause the bonds to enter and pass through the rolls in central alignment and avoid a lateral displacement; and the corrugations having thus been marked or defined, find their way readily into the initial stretching rolls 35, wherein the dies 35' are in the form of annular V-flanges having a more acute angle of say 60°, and so cooperating that the bond corrugations will be considerably deepened and the connecting strands considerably stretched or elongated.

As shown in the drawings, the rib forming rolls 36 are preferably located immediately in rear of the initial stretching rolls, where the strands have been stretched sufficiently to permit a lateral separation of the bonds to supply material for the formation of the ribs; and it is also preferred to fully form the ribs at this stage of the process, for the reason that their greater depth gives better engagement with the diverging guides for the expanding operation, than if the shallower beads were continued beyond the initial stretching rolls.

From the ribbing roll 36, the sheet is passed continuously through one or more sets of final stretching rolls 41, and rib conveyor rolls 42 and intervening diverging rib guides 43, by which the bond corrugations are further deepened, the strands further stretched or elongated, and the bonds further separated to fully expand the sheet and deploy the mesh 44 as shown in Figs. XI and XIV; after which the expanded sheet is passed through straightening rolls 45, mesh flattening rolls 46, and shearing rolls 47 and intervening parallel rib guides, by which the fully expanded and flattened sheet shown in Fig. XII, is cut into suitable lengths 48 and delivered upon a table 49, where the product may be bound into bundles ready for shipment.

The described method of preparing strip-sheets entirely by longitudinal rolling into very long lengths, of the required width and uniform thickness and temper throughout, and with a longitudinal arrangement of the grain and such flaws as there may be in the metal; not only facilitates the operation, reduces the losses, and increases the efficiency and output of the lath machine, as described, but also improves the product by giving the same a uniformity of thickness and strength in each and all of its individual bonds and strands.

The extensive and rapidly increasing use of expanded metal lath as a reinforcement in concrete floor and other building construction, requires a uniformity in the strength of the individual bonds and strands, which perform the function of tension truss members in such construction, to avoid a failure in any portion thereof which would be detrimental or destructive of the whole; and the described method of making expanded metal lath produces the same without any transversely extending flaws in its tension members and eliminates such cause of a failure therein.

The scope of the invention is not limited to the particular lath making machine and method illustrated and described herein, for obviously the improved method of making strip-sheets is applicable to other lath making machines and methods with many, if not all of the advantages, and beneficial results which are set forth herein.

We claim:

1. The method of making expanded metal which includes rolling sheet-bars, strips or the like longitudinally only to form strip-sheets, then slipping the strip-sheets to form bonds and strands, and expanding the resultant meshes.

2. The method of making expanded metal which includes rolling sheet-bars, strips or the like longitudinally only to form strip-sheets, then slitting the strip-sheets longitudinally to form bonds and strands, and expanding the resultant meshes.

3. The method of making expanded metal which includes rolling sheet-bars, strips or the like longitudinally only to form strip-sheets, then slitting the strip-sheets longitudinally to form bonds and strands, then straight stretching the strands to elongate them by tension, and expanding the resultant meshes.

4. The method of making expanded metal which includes cold rolling sheet-bars, strips or the like longitudinally only to form strip-sheets, then slitting the strip-sheets to form bonds and strands, and expanding the resultant meshes.

5. The method of making expanded metal which includes rolling sheet-bars, strips or the like longitudinally only to form strip-sheets, then annealing the same, then slitting the strip-sheets to form bonds and strands, and expanding the resultant meshes.

6. The method of making expanded metal which includes rolling sheet-bars, strips or the like longitudinally to form strip-sheets, then coiling and annealing the same, then slitting the strip-sheets to form bonds and strands, and expanding the resultant meshes.

7. The method of making expanded metal which includes hot rolling ingots, slabs or the like longitudinally only to form sheet-bars, strips or the like, then rolling the same longitudinally to form strip-sheets, then slitting the strip-sheets to form bonds and strands, and expanding the resultant meshes.

8. The method of making expanded metal which includes hot rolling ingots, slabs or the like longitudinally to form sheet-bars, strips or the like, and annealing the same, then rolling the same to form strip-sheets and annealing the same, and then slitting the strip-sheets to form bonds and strands, and expanding the resultant meshes.

9. The method of making expanded metal which includes hot rolling ingots, slabs or the like longitudinally to form sheet-bars, strips or the like and coiling and annealing the same, then rolling the same longitudinally to form strip-sheets and coiling and annealing the same, then slitting the strip-sheets to form strands and bonds, and expanding the resultant meshes.

HARRY M. NAUGLE.
ARTHUR J. TOWNSEND